Sept. 16, 1947.                R. C. McKENDRY                    2,427,364
            DYNAMIC TOLERANCE METHOD OF TESTING BEARINGS
              WITH MEANS FOR CARRYING SAME INTO EFFECT
                   Filed March 12, 1945        3 Sheets-Sheet 2
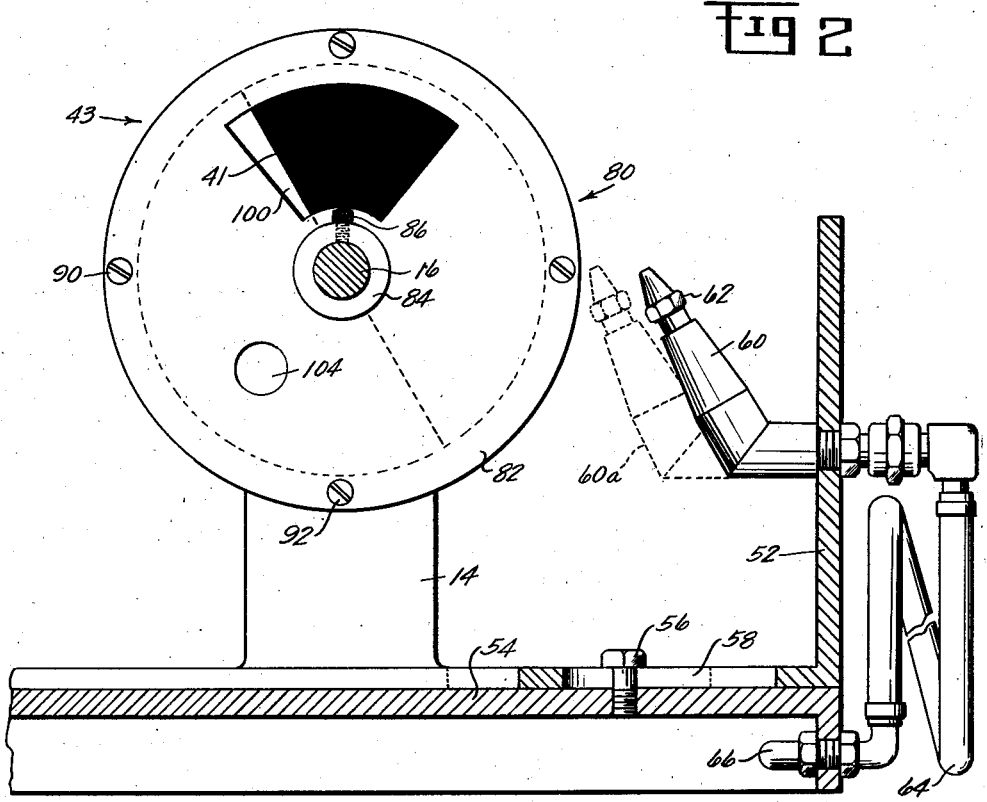
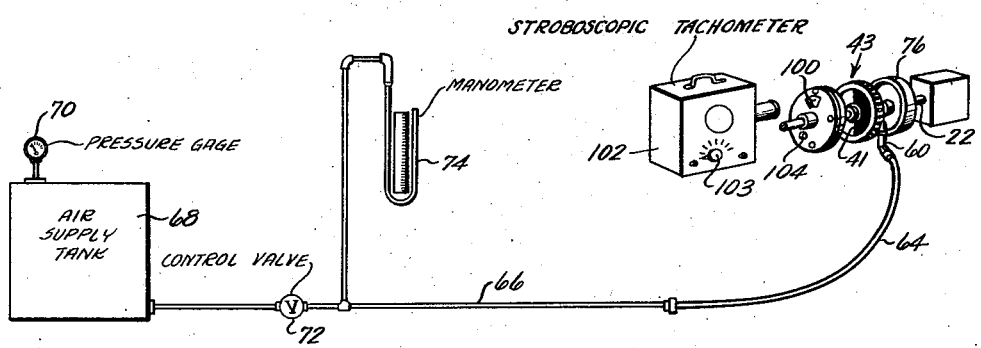
INVENTOR.
RICHARD C. McKENDRY

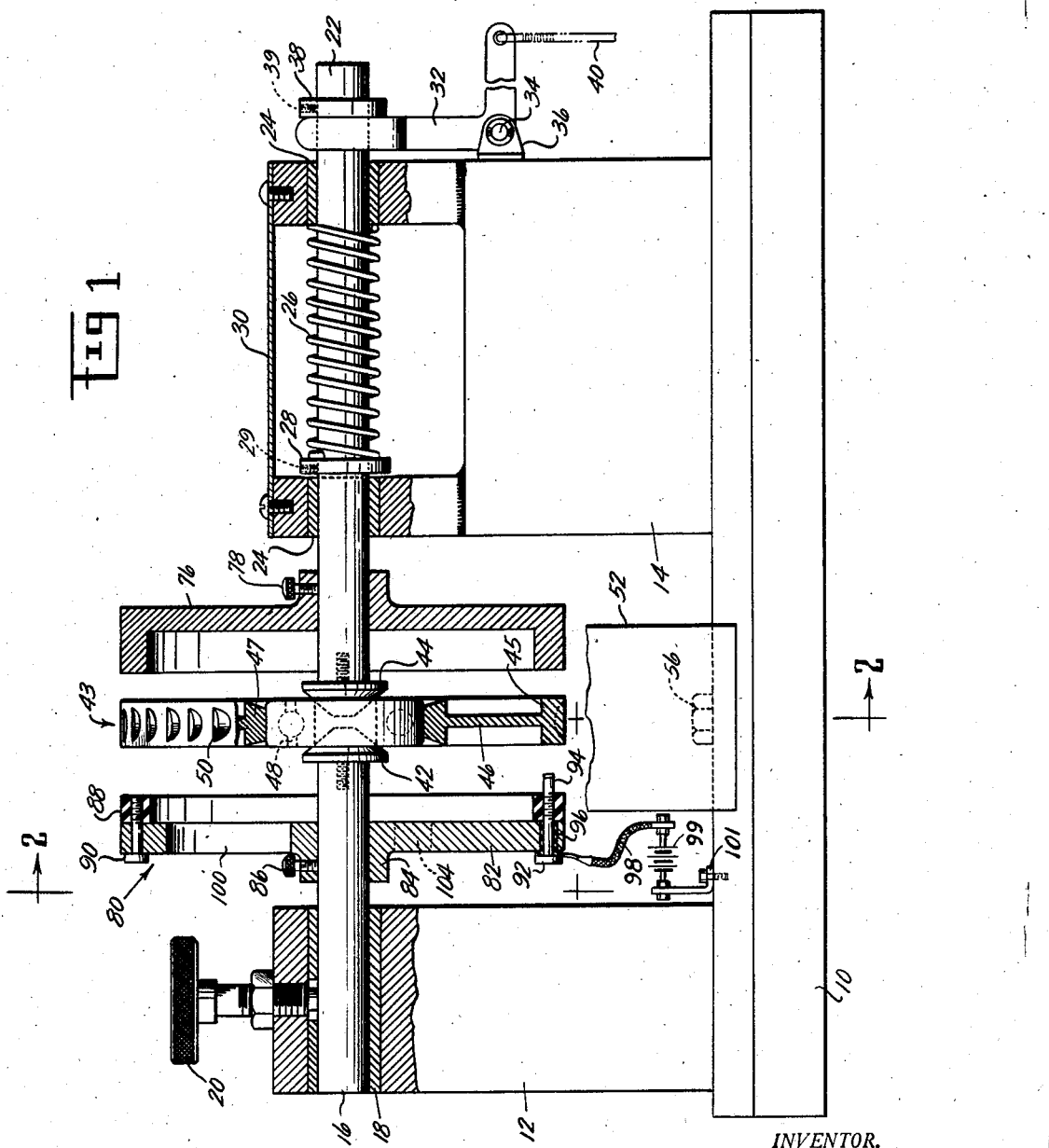

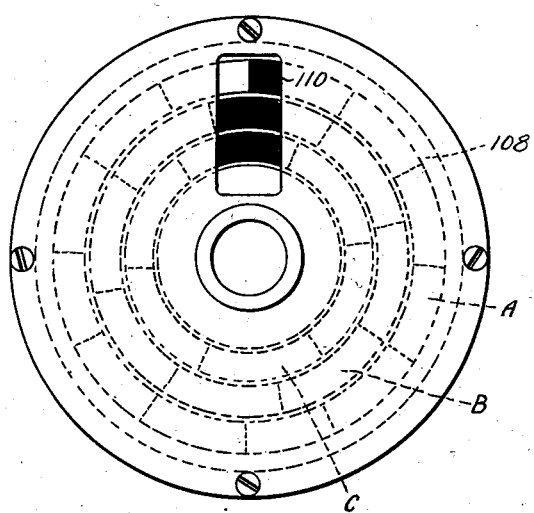
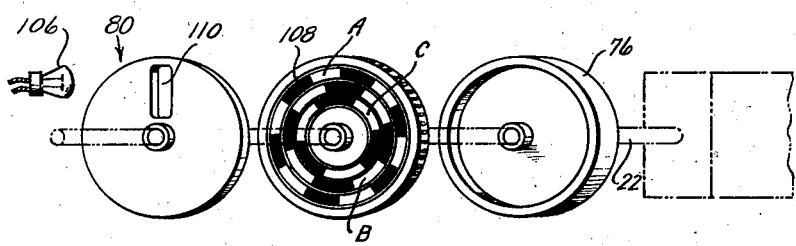

Patented Sept. 16, 1947

2,427,364

UNITED STATES PATENT OFFICE 2,427,364

DYNAMIC TOLERANCE METHOD OF TESTING BEARINGS WITH MEANS FOR CARRYING SAME INTO EFFECT

Richard C. McKendry, Dayton, Ohio

Application March 12, 1945, Serial No. 582,379

10 Claims. (Cl. 73—432)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method and means for testing bearings, having particular reference to precision antifriction bearings.

It is well known that the element of precision and perfection in antifriction bearings varies greatly, and numerous testing methods have been devised to insure in each case a degree of freedom from friction losses commensurate with the use to which the bearing is to be put. These testing methods comprise static checks for radial and axial play which at best indicate only the clearances at some chance points, or running the bearings under load, electric torque tests, tests for dynamic unbalance, etc., the latter under the assumption that the vibration manifestations are due to an out of balance bearing, when they are in fact usually due to looseness, roughness, or minute deposits of carbon or other foreign matter on the balls or races.

It is therefore an object of this invention to provide a method and means for testing bearings which, although it is not intended to replace such tests as the conventional checks on bore and diameter, or running the bearing under load, etc., will indicate the resultant of all the clearances as well as the surface conditions and general action and thereby furnish a basis upon which the performance of any bearing in a given situation may be predicted, and therefore further sort or discriminate between bearings which, when tested by conventional methods, were presumed to possess a like degree of perfection.

I attain this and other objects by the method and the means described in the following specification and shown in the drawings, wherein:

Fig. 1 is a front elevation, partly in section, of a test stand which is the main portion of the equipment by means of which I carry my testing method into effect.

Fig. 2 is an end view of the test stand also shown partly in section.

Fig. 3 is a more or less diagrammatic view showing the test stand assembled with other units of the equipment.

Fig. 4 shows a modification of the equipment assembly shown in Fig. 3.

Fig. 5 shows a part of the equipment of Fig. 4 in detail.

Like reference characters refer to like parts throughout the drawings.

Referring now to the drawing, a bed plate 10 has a headstock 12 and a tailstock 14 spaced thereon and secured thereto. A head spindle 16 is slidable in a sleeve 18 pressfitted in the headstock 12. A hand screw 20 is provided for locking the spindle 16 in any position within the range of its axial movement.

A tail spindle 22 is slidable in bushings 24 which are pressfitted in the tailstock 14. A spring 26, surrounds the tail spindle 22, its rearward end resting against a bushing 24 and its forward end against a collar 28 which is axially adjustable on the spindle 22 by means of a setscrew 29. A cover 30 protects the spindle against dirt and grit from the outside.

A bellcrank 32 is hinged at 34 to a bracket 36 which is fast to the tailstock 14. The upper end of the bell crank is bifurcated to receive the tail spindle 22 between its prongs. A collar 38 against which the bellcrank acts is axially adjustable on the tail spindle 22 by means of the screw 39. A pedal rod 40 is hinged to the outer end of the bellcrank for operation by a pedal (not shown).

Frustoconical head and tail centers 42 and 44 are provided, the centers adapted to hold a limited range of bearing sizes, but are made removable so that larger or smaller centers may be provided when larger or smaller sizes of bearings are to be tested. A bucket wheel 43 having a rim 45 and web 46 has its hub 47 bored centrally for a hand-push fit over the outer race of a bearing 48. Buckets 50 are formed in the rim 45 of the wheel, whereby the wheel may be rotated by air under pressure. The web 46 of the wheel 43 has a stroboscopic pattern 41 painted thereon which is half black and half white as shown in Fig. 3. The wheel may preferably be made of aluminum or similar light metal or it may be made of molded plastic, or of paper, with a stroboscopic pattern painted or printed thereon or printed on paper and pasted thereon or otherwise attached thereto. In any event the weight of the wheel should not exceed several ounces. The shape of the buckets 50 may be curved as in Fig. 1, straight across like saw teeth, or on large size bearings the airstream may be applied tangentially to the outer bearing race directly, without employing the bucket wheel, if so desired.

A bracket 52 is slidably fitted to a channel 54 in the bedplate 10 for transverse adjustment of the bracket on the bedplate. A screw 56 extends through a slot 58 into a tapped opening in the bedplate for locking the bracket in the adjusted position.

An air nozzle 60 is carried on the bracket 52 and is provided with an adjustment 62 on its discharge end. The operating position of the nozzle 60, when using a bucket wheel of the size shown, is indicated by the dotted outline 60a. A rubber hose 64 and piping 66 connects the nozzle to an air supply tank 68. A gauge 70 indicates the pressure in the tank. A control valve 72 is employed to regulate the nozzle pressure, a manometer 74 or other accurate pressure gauge being arranged to indicate when the desired nozzle pressure is achieved.

Axially slidable on the forward end of the tail spindle 22 is a cup-shaped member 76 which may be pushed forward against the rim 45 of the bucket wheel 43 to align the wheel, that is, to bring the face of the wheel into a plane normal to the axis of the tail spindle 22. This is particularly essential when testing self-aligning bearings so as to start the test with the outer race of the bearing in alignment with the inner race. The member 76 may also serve as a brake for holding the bucket wheel 43 from rotation until other adjustments are made. When thus used as a brake, the thumb screw 78 may be tightened to hold the member 76 in the braking position.

Axially slidable on the head spindle 16 is a side wobble detecting member 80 which comprises a flange 82 and hub 84 which may be moved axially on the spindle to a desired position and held there by tightening the thumb screw 86. An insulating ring 88 is held to the flange 82 by screws 90. A contact screw 92 has a contact point 94 and is electrically insulated from the flange 82 by an insulating bushing 96. A conductor 98 is provided for bringing an electric current to the contact screw 92. The insulated conductor 98 may be connected to one terminal of a battery 99 which has the other terminal grounded to the bedplate 10 at 101. A window 100 in the web 82 is provided for illumination and for visual inspection of the stroboscopic pattern 41 on the web of the bucket wheel 43; the Strobotac 102, a stroboscopic tachometer, being so placed as to illuminate the pattern 41 through the window 100. A knob 103 is conventionally provided on the Strobotac for setting the device to give the desired number of flashes per minute. A smaller window 104 is located about one-quarter turn from the larger window. The purpose of the small window 104 will hereinafter become apparent. Procedure for testing a bearing with the equipment shown in Figs. 1, 2, and 3 may preferably be substantially as follows:

Assume that the pressure in the air supply tank 68 is being maintained substantially constant by some suitable source of supply, and that the nozzle 60 has been adjusted to proper tangency, put a bearing 48, which may preferably have already been given such conventional checks as its intended use may require, by finger pressure into a bucket wheel 43. If pressure greater than finger pressure is required to insert the bearing into the wheel, a wheel with a shade larger bore should be selected. When assembled together, mount the bearing and wheel between the centers 42—44 as shown (see Fig. 1) by withdrawing the tail center 44 with a foot pedal (not shown) which acts through the bellcrank 32 to withdraw the tail spindle 22 to the right so that the bearing and wheel may be entered. If the nozzle stream is not now centered with the centers of the buckets, loosen the screw 20 and adjust the head spindle axially to bring the nozzle and brackets into alignment.

Now loosen the thumb screw 78 and move the aligning member 76 axially to the left until it contacts the edge of the bucket wheel so as to bring the edge of the outer race of the bearing into a plane normal to the axis. This operation is especially necessary when the bearing is a self-aligning one with two rows of balls as in an SKF type.

Now withdraw the aligning member 76 from contact with the bucket wheel 43. Thereafter, with an eye on the bucket wheel, open the valve 72 very gradually, so that pressure increase will be at a rate not more than one pound per square inch in thirty seconds. When the bucket wheel breaks the static friction and starts rotating, read the pressure required to start it on the manometer 74. This test should be repeated, selecting at least three different relative positions between the inner and outer race as the starting point and recording the highest of the three tests. For purposes of description this recorded manometer reading in lbs. per square inch will be called the "Initial Friction" which, in the present system, is the first element of discrimination by which subsequent performance of the bearing may be evaluated.

It is noted, however, that where the "initial friction" test stands alone as in prior practice, it does not definitely determine anything, for the reason that a high "initial friction" reading may be obtained where the balls and races are either rough and fitted loosely, or finely finished but fitted too closely, and the "initial friction" test standing alone does not indicate which of these two conditions is present. Other elements of discrimination, however, which are hereinafter described are introduced to show which of the two conditions is present.

As a second step of the system align the bucket wheel by using the member 76, and tighten the screw 78 to hold the bucket wheel nonrotative. Loosen the screw 86 and bring the member 80 to the right until the contact 94 is within .046" to .062" of touching the rim of the bucket wheel, the distance depending on the use to which the bearing is to be put. The distance may be determined with a feeler gauge. Now set the Strobotac at say fifteen hundred flashes per minute, for although it is not to be used for this, the second step of the test, it will then be ready for its part in the third step which immediately follows the second. Next open the control valve 72 slowly and observe the manometer 74 until it shows a nozzle pressure which may preferably be double the previously recorded "initial friction" in lbs. per square inch, then withdraw the braking member 76 axially to the right and allow the bucket wheel to begin acceleration under the action of the nozzle 60.

As the bearing accelerates from zero it wobbles sidewise due either to spotty roughness of the working surfaces or to looseness between the balls and races which permits too great axial play. If the side wobble at the grounded wheel 43 is greater than the space between the edge of the wheel and the contact point 94, a circuit will be made and broken at the end of the contact point at each revolution of the wheel, the flashes due to breaking of the circuit being visible to indicate that the wobble is in excess of the permissible value. The wobble is usually maximum near the beginning of acceleration and it may be that it is initiated by the fact that the circumferential speed of the buckets is at this time less than the linear speed of the airstream which may cause air to spill first out of one side then out of the other. In any event, the wobble has been found by experiment to be a function of the axial play in the bearing. The bearing passes this test when the wobble is less than that amount necessary to cause the edge of the bucket wheel to make contact with the contact point 94. The bearing is marked with a minus (—) if the wobble is below the standard selected for the particular installation in which the bearing is to be used, and with a plus (+) if it is above the selected standard. For purposes of description, the side wobble just described will be referred to as the "dynamic end play," which is the second element of discrimination in the test of a bearing by the "dynamic tolerance" method.

The third element of discrimination by which the performance of the bearing is evaluated will hereinafter be referred to as the "coordinate speed."

Since the maximum "dynamic end play" manifests itself in the very early stages of acceleration, and "coordinate speed" becomes evident only after acceleration has progressed to a relatively high speed, the "coordinate speed" test may preferably be made immediately following the "dynamic end play" test without interrupting the acceleration of the bucket wheel.

As acceleration progresses toward the higher value at which "coordinate speed" manifests itself, the wobble gradually diminishes and substantially disappears.

Now watch the stroboscopic pattern closely through the window 100 as the bucket wheel accelerates under the selected constant pressure. When the pattern 41 suddenly seems to have ceased rotating, which of course occurs when the bucket wheel reaches a speed of 1500 R. P. M. turn the Strobotac knob 103 upward fast enough to maintain the Strobotac flashes coincident with the increasing R. P. M. of the bucket wheel. That the knob is being turned fast enough to keep pace with the increasing R. P. M. of the bucket wheel will be indicated if the pattern remains nonrotative. By careful adjustment of the Strobotac knob, the line which divides the black and white portions of the pattern may be made to remain in a substantially fixed position in the window 100, a preferable position to hold it being about thirty degrees anticlockwise of the vertical center line as seen in Fig. 2. If the line which divides the black and white portions of the pattern 41 is being held steady in this position throughout the period of acceleration of the wheel, a speed will finally be reached at which, without further adjustment of the Strobotac, the pattern will drop, i. e., the pattern will turn so that the dividing line between the black and white portions will move clockwise indicating that deceleration has begun, and may appear in the smaller window 104.

When this drop in bucket wheel R. P. M. starts after acceleration ceases, let go of the knob 103, stop the bucket wheel and make record of the Strobotac setting. This recorded Strobotac reading will be the "coordinate speed." The cause of this "coordinate speed" at which a bearing ceases acceleration and shows a tendency to drop in R. P. M. is not definitely understood.

Whatever may be the cause of the phenomenon, however, it is noted that when a bearing has little radial play the phenomenon occurs at a lower speed than when the bearing has a higher radial play. Thus it has been determined by experiment that if the radial play of a series of bearings of a certain size is 3, 4, 5, 6, 7, 8, or 9 ten-thousandths of an inch, other things being equal, the "coordinate speed" will be 1900, 1950, 2000, 2200, 2400, 2700 and 3500 R. P. M. respectively. With a constant nozzle pressure and the same temperature, and other conditions being equal, this check will show the "coordinate speed" to be constant for the same bearing no matter how often the test is repeated.

It will now be seen that where the first element of discrimination, "initial friction" may indicate either looseness or roughness, the second element "dynamic end play" indicates that it is loose at least axially and will further indicate the extent of this axial looseness, while the third element "coordinate speed" will show whether the bearing has radial play and how much. Moreover, these checks not only indicate the condition at several points within the bearing as is the case where conventional checks are employed but they indicate the condition of the bearing at all points, i. e., the checks are running checks as against the static checks of common practice.

By establishing tolerances appropriate to the situation in which the bearings are to be used, a series of bearings which, when checked by conventional methods are presumed to be alike, by the "dynamic tolerance" tests may be further sorted into several grades of varying refinement, each appropriate to the installation in which it is to be used.

In the modification shown in Figs. 4 and 5 which is a less expensive arrangement than that hereinbefore shown, the Strobotac 102 of Fig. 3 is replaced by a neon light 106, and the pattern 41 of Fig. 3 by a pattern 108. The member 80 shown in Figs. 1 and 2 may be retained although it is not necessary that the image be viewed through the window 110. Pattern 108 is shown to an enlarged scale in Fig. 5 and consists of three circular spaces, the outer circular space designated A being divided into 12 equal spaces, six black and six white, the next space, designated B, into eight equal spaces, four black and four white, and the third space, designated C, into six equal spaces, three black and three white.

The equation for determining the R. P. M. at which the revolving images A, B, and C will appear to be stationary is, $$F\frac{D}{S}=R$$

wherein,
F=number of flashes per minute.
S=number of black spaces in circle.
D=number of black spaces reaching a given point per flash.
R=R. P. M. at which the pattern will appear stationary.

By employing the above equation, it may be shown that with a neon light, on 60 cycle A. C. current, flashing 3600 times per minute, the images A and C both appear to cease rotation when the pattern is rotating either 1200 or 2400 R. P. M., the images A and B appear to cease rotation when the pattern is rotating 1800 R. P. M., the image B alone appears to cease rotation when the pattern is rotating 2700 R. P. M., while at 3600 R. P. M. all images appear to stop. Thus while it is not possible, with this modification, to determine exactly the R. P. M. of a rotating part, it is possible to determine when it is rotating more than 1200 or less than 1800 R. P. M. or more than 1800 and less than 2400 R. P. M., etc., and this degree of perfection may be sufficient where the use to which the bearings are to be put does not call for too great accuracy. Having described an embodiment of my invention and a modification thereof, I claim:

1. The method of testing antifriction bearings to determine their overall degree of running perfection, which consists of supporting the bearing by the inner race, leaving the outer race free to rotate, applying a tangentially directed airstream to rotate the outer race without mechanical or electrical connection thereto, gradually increasing the pressure of the airstream until the outer race begins rotation, repeating the latter test by beginning at different points, tabulating the highest pressure at which the outer race began rotation, stopping rotation of the outer race and putting it into a plane normal to the axis of rotation, raising the pressure of the airstream to double the said highest tabulated pressure, releasing the outer race to be rotated and continuously accelerated by the said doubled air pressure, whereby said outer race at first wobbles axially, determining and recording the extent of said axial wobble, continuing the acceleration under said doubled pressure until said wobble substantially disappears, further continuing the acceleration under said doubled pressure until said acceleration ceases and begins to drop and recording the speed at which said acceleration ceased and began to drop.

2. The method of testing antifriction bearings, which consists of supporting the bearing by the inner race, leaving the outer race free to rotate, applying a tangentially directed airstream to rotate the outer race without mechanical or electrical connection thereto, gradually increasing the pressure of the airstream until the outer race begins rotation, tabulating the pressure at which the outer race began rotation, stopping rotation of the outer race and bringing it into a plane normal to the axis of rotation, raising the pressure of the airstream to a predetermined constant value which is double the said tabulated pressure, releasing the outer race to be rotated and continuously accelerated by the said predetermined constant air pressure, whereby said outer race at first wobbles axially, determining and recording the extent of said axial wobble, continuing the acceleration under the said predetermined constant pressure until said wobble substantially disappears, further continuing the acceleration under the said predetermined constant pressure until said acceleration ceases and deceleration begins, and recording the speed at which said acceleration ceased and said deceleration began.

3. The method of testing antifriction bearings, which consists of supporting the bearing by the inner race, leaving the outer race free to rotate, applying a tangentially directed airstream to rotate the outer race, gradually increasing the pressure of the airstream until the outer race begins rotation, tabulating the pressure at which the outer race began rotation, stopping rotation of the outer race, raising the pressure of the airstream to a predetermined constant value, releasing the outer race to be rotated and continuously accelerated by the said predetermined constant air pressure, whereby said outer race at first wobbles axially, determining and recording the extent of said axial wobble, continuing the acceleration under the said predetermined constant pressure until said wobble substantially disappears, further continuing the acceleration under said predetermined constant pressure until said acceleration ceases, and recording the speed at which said acceleration ceased.

4. Steps in the method of testing antifriction bearings, which consists of supporting the bearing by the inner race, leaving the outer race free to rotate, applying an airstream to rotate the outer race, gradually increasing the pressure of the airstream until the outer race begins rotation, tabulating the pressure at which the outer race began rotation, stopping rotation of the outer race, raising the pressure of the airstream to a predetermined constant value, releasing the outer race to be rotated and continuously accelerated by the said predetermined constant air pressure, continuing the acceleration under said predetermined constant pressure until said acceleration ceases, and recording the speed at which said acceleration ceased.

5. A step in the method of testing antifriction bearings which consists of supporting the bearing by the inner race, holding the outer race against rotation, applying a constant pressure airstream to the outer race to rotate it, releasing the outer race for rotation, causing the outer race to accelerate under the said constant pressure airstream until said acceleration ceases and noting the speed at which said acceleration ceases.

6. A step in the method of testing antifriction bearings which consists of supporting the bearing by the inner race, holding the outer race against rotation, applying a constant pressure airstream to the outer race to rotate it, releasing the outer race for rotation, causing the outer race to accelerate under said constant pressure whereby said outer race wobbles axially at the beginning of rotation, and measuring the extent of said axial wobble.

7. Apparatus for testing antifriction bearings, which consists of a means for supporting a bearing by the inner race thereby holding said inner race nonrotative, a bucket wheel fitted to the outer race to rotate therewith, a nozzle positioned on said supporting means for directing a tangential airstream to rotate the said bucket wheel, an aligning and holding means operable to one position to align said outer race in a plane normal to the axis and hold it against rotation and to another position to release said outer race for rotation, whereby said bucket wheel wobbles axially during the beginning of acceleration, means to measure said wobble, an air pressure source, means for connecting said source to said nozzle, a valve in the connecting means for regulating the pressure at said nozzle, gage means for indicating the nozzle pressure, and means to indicate the maximum speed at which acceleration ceases at a given gage pressure and for a given freedom in said bearing.

8. Apparatus for testing antifriction bearings, which consists of a means for supporting a bearing by the inner race thereby holding said inner race nonrotative, an air driven wheel fitted to the outer race to rotate therewith, a nozzle positioned on said supporting means for directing a tangential airstream to rotate the said wheel, an aligning and holding means operable to one position to align said outer race in a plane normal to the axis and hold it against rotation and to another position to release said outer race for rotation, whereby said wheel wobbles axially during the beginning of acceleration, means to measure said wobble, an air pressure source connected to said nozzle, a valve between said source and said nozzle for regulating the pressure at said nozzle, gage means for indicating the nozzle pressure, and means to indicate the RPM at which maximum acceleration is reached with a given gage pressure and for a given freedom in said bearing.

9. Apparatus for testing antifriction bearings, which consists of a test stand for supporting a bearing by the inner race thereby holding said inner race nonrotative, a bucket wheel fitted to the outer race to rotate therewith, a nozzle so positioned on said supporting means as to direct a tangential airstream to rotate the said bucket wheel, an aligning and holding disc coaxial with said wheel operable to one position to align said outer race in a plane normal to the axis and hold it against rotation and to another position to release said outer race for rotation, whereby said bucket wheel wobbles axially during the beginning of acceleration, means to measure said wobble, an air pressure source connected to said nozzle, a valve between said nozzle and said source for regulating the pressure at said nozzle, gage means between said valve and said nozzle for indicating the nozzle pressure, and stroboscopic means to indicate the maximum R. P. M. at which acceleration ceases at a given gage pressure and for a given freedom in said bearing.

10. Apparatus for testing antifriction bearings, which consists of a test stand having coaxial head and tail spindles, conical centers in the interfacing ends of said spindles for supporting a bearing by the inner race thereby holding said inner race nonrotative, an air actuated wheel fitted to the outer race to rotate therewith, a nozzle on said test stand positioned for directing an airstream to rotate the said wheel, an aligning disc operable to one position to align said outer race in a plane normal to the axis and to another position to release said outer race for rotation, whereby said wheel wobbles axially during the beginning of acceleration, a gauge on said stand to measure said wobble, an air pressure source connected to said nozzle, a valve interposed between said source and said nozzle for regulating the pressure at said nozzle, gage means for indicating the nozzle pressure, and an adjustable stroboscope tachometer to indicate maximum R. P. M. at which acceleration ceases at a given gage pressure and for a given freedom in said bearing.

RICHARD C. McKENDRY.

REFERENCES CITED

The following references are of record in the file of this patent:

UNITED STATES PATENTS

| Number | Name | Date |
|---|---|---|
| 1,252,695 | Hopkins | Jan. 8, 1918 |
| 2,383,588 | Bousky | Aug. 28, 1945 |
| 2,333,040 | Pope | Oct. 26, 1943 |
| 2,127,605 | Kucher et al. | Aug. 23, 1938 |